Sept. 16, 1924.

M. S. LIGNOSKI

PIPE HOLDER

Filed Jan. 3, 1921

1,508,661

INVENTOR.
Milton S. Lignoski
BY
Hardway & Cather
ATTORNEYS.

Patented Sept. 16, 1924.

1,508,661

UNITED STATES PATENT OFFICE.

MILTON S. LIGNOSKI, OF HOUSTON, TEXAS, ASSIGNOR TO GERALD R. LIVERGOOD, OF HOUSTON, TEXAS.

PIPE HOLDER.

Application filed January 3, 1921. Serial No. 434,590.

*To all whom it may concern:*

Be it known that I, MILTON S. LIGNOSKI, a citizen of the United States, residing at Houston, in the county of Harris and State of Texas, have invented certain new and useful Improvements in a Pipe Holder, of which the following is a specification.

This invention relates to new and useful improvements in a pipe holder.

One object of the invention is to provide a pipe engaging slip which is adapted to be inserted in a rotary around the pipe to be held and which will clamp and hold the pipe against turning or against dropping into the bore.

A further feature of the invention resides in the provision of a slip which is formed of sections flexibly united together so that the slip will readily conform to and engage the pipe on all sides, thus securely holding the pipe and insuring it against dropping into the bore.

The device is particularly adapted for use in holding a string of pipe suspended in the bore when the string is being broken up in the operation of withdrawal or is being made up as it is being let down into the bore.

With the above and other objects in view the invention has particular relation to certain novel features of construction, operation and arrangement of parts, an example of which is given in this specification and illustrated in the accompanying drawings, wherein:—

Figure 1:
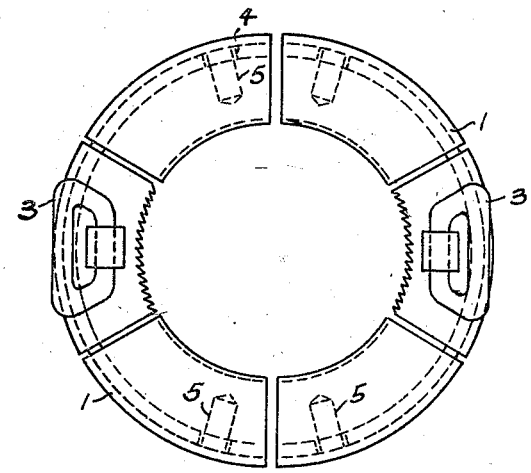
Figure 1 is a plan view of the device.
Figure 2:
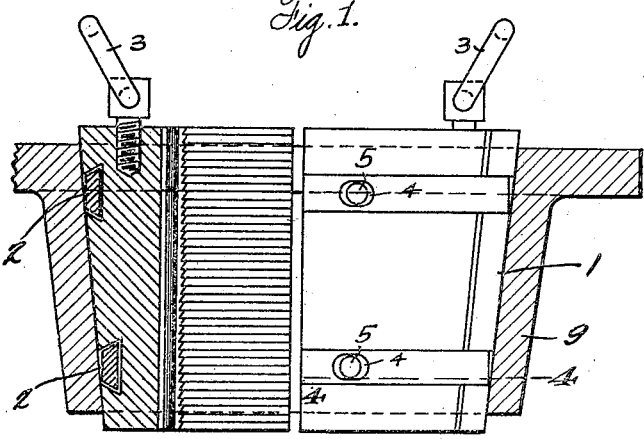
Figure 2 is a side view, shown partially in section.
Figure 4:
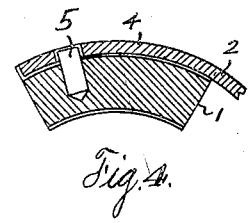
Figure 4 is a fragmentary transverse sectional view taken on the line 4—4 of Figure 2.

Referring now more particularly to the drawings, wherein like numerals of reference designate similar parts in each of the figures, the numeral 1 refers to the arcuate sections of the slip. As shown there are six of these and three on each side are united together by means of the flexible stays 2, 2, which are arcuate in form and which, as shown in Figures 1 and 2, are dovetailed into the outer periphery of the sections so as to unite the sections on each side into two units. Each unit is provided with a handle 3 by means of which it can be manipulated. The stays 2 have oblong slots 4, 4, one at each end and securing pins 5 are driven into bores in the end sections, provided for them, the outer ends of said pins working through said slots. The inner sides of some of said sections are transversely toothed and the inner sides of the other sections have vertical teeth, said teeth engaging with the pipe to prevent it from turning or from slipping down. It is to be observed that the sections 1 are tapered downwardly, that is, they are wedge-shaped in form so that they will wedge in the rotary spider 9 against and grip the pipe. The stays 2 being flexible, permit the slip to adjust itself to the contour of the pipe and engage therewith all the way around, thus securing a better hold on the pipe.

Figure 3:
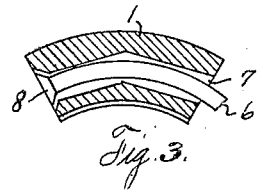
Figure 3 shows a fragmentary transverse sectional view of one of the sections of another form of the device.

As shown in Figure 3 another form of stay 6 passes through the bores 7 of the sections 1 and the ends of the stay are formed with enlarged heads as 8 to secure them against detachment.

What I claim is:—

1. A pipe engaging means including a plurality of slips, each slip comprising a plurality of arcuate toothed jaws, and transverse flexible members intermediate the ends of said jaws to secure said jaws loosely together in the manner stated.

2. A pipe engaging means including a plurality of slips, each slip comprising a plurality of arcuate toothed jaws, transverse flexible members intermediate the ends of said jaws to secure said jaws together and to allow movement of said jaws relative to each other, and a handle secured to the central jaw of the slip to move said slip as a unit.

In testimony whereof I have signed my name to this specification in the presence of two subscribing witnesses.

MILTON S. LIGNOSKI.

Witnesses:
R. M. SMITH,
WM. A. CATHEY.